(12) United States Patent
Daniels

(10) Patent No.: US 8,308,838 B2
(45) Date of Patent: Nov. 13, 2012

(54) ORGANIC FERTILIZER

(75) Inventor: Ralph S. Daniels, East Greenwich, RI (US)

(73) Assignee: Daniels Agrosciences, LLC, East Greenwich, RI (US)

( * ) Notice: Subject to any disclaimer, the term of this patent is extended or adjusted under 35 U.S.C. 154(b) by 251 days.

(21) Appl. No.: 12/835,006

(22) Filed: Jul. 13, 2010

(65) Prior Publication Data

US 2012/0011910 A1  Jan. 19, 2012

(51) Int. Cl.
*C05F 11/00* (2006.01)
(52) U.S. Cl. ..................................... 71/22; 71/11; 71/23
(58) Field of Classification Search .................. 71/11–26
See application file for complete search history.

(56) References Cited

U.S. PATENT DOCUMENTS

| | | | |
|---|---|---|---|
| 2,067,002 A * | 1/1937 | Pollak | 435/243 |
| 3,914,438 A * | 10/1975 | Holt et al. | 426/61 |
| 4,575,391 A * | 3/1986 | DeBoodt et al. | 71/28 |
| 4,836,843 A | 6/1989 | Daniels | |
| 4,869,918 A | 9/1989 | Melnychyn | |
| 5,308,372 A | 5/1994 | Daniels | |
| 5,443,613 A * | 8/1995 | Robinson | 71/12 |
| 5,697,186 A | 12/1997 | Neyra et al. | |
| 5,759,223 A * | 6/1998 | Carlson et al. | 71/5 |
| 6,187,326 B1 | 2/2001 | Yamashita | |
| 6,426,113 B1 | 7/2002 | Daniels | |
| 6,632,952 B1 | 10/2003 | Daniels | |
| 6,858,058 B2 | 2/2005 | Daniels | |
| 7,074,252 B2 | 7/2006 | Daniels | |
| 7,166,688 B1 * | 1/2007 | Dean | 528/354 |
| 8,002,870 B2 * | 8/2011 | Yamashita | 71/11 |
| 2002/0088262 A1 | 7/2002 | Daniels | |
| 2002/0198393 A1 | 12/2002 | Daniels et al. | |
| 2003/0066322 A1 * | 4/2003 | Perriello | 71/24 |
| 2003/0143303 A1 | 7/2003 | Daniels | |
| 2003/0236422 A1 | 12/2003 | Daniels | |
| 2004/0043445 A1 | 3/2004 | Daniels | |
| 2007/0095117 A1 * | 5/2007 | Chintala | 71/23 |
| 2007/0131010 A1 | 6/2007 | Binder et al. | |
| 2008/0124443 A1 | 5/2008 | Daniels | |
| 2009/0078014 A1 | 3/2009 | Yamashita | |
| 2011/0247379 A1 * | 10/2011 | Cannock | 71/23 |

FOREIGN PATENT DOCUMENTS

| | | | |
|---|---|---|---|
| DE | 3826390 | * | 11/1989 |
| JP | 6172117 A | | 6/1994 |
| WO | 91/16280 A1 | | 10/1991 |

OTHER PUBLICATIONS

Nakano, et al., "Effects of Organic Liquid Fertilizer (Corn Steep Liquor) on Initial Growth and Rhizosphere of Tomato Plant", Department of Protected Cultivation (NIVOT), Taketoyo, Aichi 470-2351, Japan, Graduate School of Bioagricultural Science, Nagoya University, Nayoga 464-8601, Japan, Mar. 27, 2000, vol. 38, No. 4.
PCT International Search Report & Written Opinion in PCT Appln. No. PCT/US2010/058310 mailed Sep. 8, 2011.
McEvoy, Miles, "Organic Certification in the United States and Europe" Tree Fruit Postharvest Conference, Washington D.C., Dec. 2, 2003 and Dec. 3, 2003.
Jacobey, Mitch, "Sowing the Seeds of Oil Customization" Chemical & Engineering News, 88 (22), May 31, 2010.
United States Department of Agriculture (USDA) National Organic Program, Title 7 CFR part 205, Jul. 9, 2010.
Wikipedia Article, "Fertilizer" Jul. 5, 2010.
Wikipedia Article, "Organic Certification" Jul. 2, 2010.
Wikipedia Article, "International Federation of Organic Agriculture Movements" Feb. 4, 2010.
European Union Council Regulation (EC) No. 834,2007 of Jun. 28, 2007, "On Organic Production and Labeling of Organic Products and Repealing Regulation (EEC) No. 2092/91."

* cited by examiner

*Primary Examiner* — Wayne Langel

(57) ABSTRACT

The invention relates to organic fertilizers that satisfy the standards in both the United States and the European Union to be labeled as organic. The organic fertilizer comprises oilseed extract and/or corn steep liquor in combination with whey and/or other protein supplements, which provide a natural, nitrate free, nitrogen to the fertilizer. Additionally, a method of manufacturing an organic fertilizer comprising heating an oilseed extract, dissolving whey in the heated extract, and filtering the resultant mixture for use domestically and abroad.

20 Claims, No Drawings

US 8,308,838 B2

ORGANIC FERTILIZER

FIELD OF THE INVENTION

This invention relates to the field of organic fertilizers.

BACKGROUND OF THE INVENTION

Plant growth is determined by a variety of environmental factors including temperature, available water, available light, and available nutrients in the soil. The nutrients necessary for plant growth include: the primary macronutrients nitrogen (N), phosphorus (P), potassium (K); the secondary macronutrients calcium (Ca), sulfur (S), magnesium (Mg); and the micronutrients or trace minerals boron (B), chlorine (Cl), manganese (Mn), iron (Fe), zinc (Zn), copper (Cu), molybdenum (Mo), selenium (Se). Fertilizers, also referred to herein as plant food, supplement the soil with varying amounts of the nutrients necessary for plant growth.

In this invention, oilseed extract and/or corn steep liquor are combined with whey to produce an organic plant food. Oilseed extract is obtained from the caustic refining of crude vegetable oils. Since refined vegetable oils are used in food products, e.g., cooking oils, shortenings and margarine, the crude oils obtained from their respective seeds must be purified to remove the undesirable constituents that would impair their commercial viability (e.g., shelf life, etc.). The refining byproduct lipid (RBL), or soapstock, as it is known in the trade, is split into oil and water components. When the acidic aqueous fraction is brought to approximate neutrality by use of a nutrient base such as potassium hydroxide or ammonium hydroxide the resultant liquid is oilseed extract.

The undesirable constituents that are removed from crude vegetable oils, are the natural germination compounds found in all seeds. These compounds are removed in the caustic refining process and reside in soapstock. When soapstock is split primarily to recover the free fatty acids and crude oil lost in refining for use in feed rations, the balance (typically 50% w/w of the soapstock) is the aqueous fraction. The aqueous fraction is the oilseed extract and contains all of the soluble organic and organo-metallic compounds found in seeds that allow the plant to reproduce via germination. Analysis of oilseed extract shows it contains the three (3) primary plant nutrients: N, P, K; the three (3) secondary plant nutrients: S, Ca and Mg; and most, if not all, of the trace element micronutrients such as Cu, Fe and Zn. In addition, oilseed extract contains high levels of carbohydrates that encourage growth of beneficial microorganisms. Oilseed extract has been described as a "perfect plant food".

Corn steep liquor (CSL) (CAS #66071-94-1) is a byproduct of the corn wet-milling process used to obtain corn starch and high fructose corn syrup (HFCS).

CSL is a viscous liquid mixture consisting entirely of the water soluble extracts/components of corn steeped in water. All constituents are naturally occurring nutritive materials such as crude proteins (e.g., N), amino acids (e.g., N), vitamins, carbohydrates (e.g., dextrose), organic acids (e.g., lactic acid), minerals (e.g., Mg, P, K, Ca and S), enzymes and other elemental nutrients. Approximately 50% of CSL is water with the remainder composed of the natural nutritive "building blocks" listed above. The primary use of CSL is as a nutrient for ruminant animals.

The nutrients in CSL, in addition to feed use for ruminants, can be used to fertilize plants. CSL contains the three (3) primary plant nutrients: N, P and K; the three (3) secondary plant nutrients: S, Ca and Mg; as well as trace element micronutrients. In addition, CSL contains carbohydrates that are biodegradable carbon sources that encourage the growth of beneficial microorganisms. As such, CSL is similar in effectiveness as a plant food as oilseed extract.

The protein in milk exists in two (2) forms, as a suspension/colloidal (casein) and in a soluble form (whey proteins).

Whey, a byproduct of cheese manufacture, is high in nitrogen, a primary plant nutrient; high in calcium, an important secondary plant nutrient; and, in addition to minor amounts of other beneficial plant minerals/nutrients, is high in carbohydrates, primarily lactose and/or lactic acid.

Whey is dehydrated and the powder used primarily as a protein rich health-food supplement. However, as noted in the previous discussion of oilseed extract and CSL, whey's components have use as plant food due to their high nitrogen and calcium content. In addition, whey contains carbohydrates that encourage growth of beneficial microorganisms.

Although each ingredient above is individually known to have use as a plant food, combinations of the above have not been disclosed. Nor have such combinations been obvious to those skilled in the art.

Daniels Pinnacle® 3-1-1 Organic Professional Greenhouse Nursery Plant Food combines Soluble Organic Nitrogen and Chilean Nitrate with oilseed extract. The Pinnacle plant food is certified organic in the United States, but due to the use of nitrates, can not be certified as organic in many foreign countries, including the European Union. Plant food that does not have nitrates is desired so it can be certified and distributed as an organic plant food in both the United States and in a variety of foreign countries.

For a fertilizer to be certified as organic it must satisfy specific governmental standards. The governmental standards may vary from country to country, and in fact the regulations for the European Union are slightly different from those of the United States. The term "organic" as used in the pending application is intended to represent that the fertilizer has satisfied the standards for being denoted as organic in both the United States and the European Union.

The United States Department of Agriculture (USDA) regulates organic certification within the United States through a National Organic Program (NOP). To qualify to use the organic label the requesting organization must be certified as satisfying a variety of guidelines by an NOP accredited certification agency. One such requirement for certification is abiding by a National List that is produced by NOP. The National List identifies what can and cannot be included in certified organic products. Specifically, all nonsynthetic (natural) materials are allowed, unless specifically prohibited and synthetic substances and ingredients and nonagricultural substances are prohibited unless specifically allowed.

Council Regulation (EC) No 834/2007 regulates organic production and labeling of organic products within the European Union (EU). To claim a product is organic, an organization must gain approval from a certification agency. Fertilizers may only be used if they have been authorized for use in organic products and mineral nitrogen fertilizers may not be used. One key distinction between the EU and the US is that the EU prohibits the use of sodium nitrate in organic products. Therefore, for a fertilizer to be certified organic in both the US and the EU it can not have nitrates.

Combinations of the above ingredients serve to make an improved commercial organic plant food formulation because each individual ingredient contains higher concentrations of plant nutrients than either of the other individual components.

SUMMARY OF THE INVENTION

The invention relates to an organic fertilizer suitable for a wide range of plant uses in which oilseed extract and/or corn steep liquor are combined with whey. The organic fertilizer is particularly well-suited to and economically advantageous in aiding plant growth.

The invention relates to an organic fertilizer. One embodiment of the invention is an organic fertilizer comprising oilseed extract and whey. Preferably, the organic fertilizer further comprises a supplement selected from the group comprising natural glycerol, humate, fulvate, acetic acid, propionic acid, and mixtures thereof. A preferred N-P-K formulation of the organic fertilizer is 3-2-2. Another preferred N-P-K formulation of the organic fertilizer is 2-0.5-2.5. Preferably, the organic fertilizer further comprises a protein supplement. More preferably, the protein supplement is selected from the group comprising hemp, protein powder, soy protein powder and mixtures thereof. Preferably, the oilseed extract and whey may be further combined with corn steep liquor.

Another embodiment of the invention is an organic fertilizer comprising corn steep liquor and whey. Preferably, the organic fertilizer further comprises a supplement selected from the group comprising natural glycerol, humate, fulvate, acetic acid, propionic acid, citric acid, lactic acid, and mixtures thereof. A preferred N-P-K formulation of the organic fertilizer is 3-2-2. Another preferred N-P-K formulation of the organic fertilizer is 3-1-2.5. Preferably, the organic fertilizer further comprises a protein supplement. More preferably, the protein supplement is selected from the group comprising hemp protein powder, soy protein powder and mixtures thereof.

In accordance with another aspect of the invention, a method for manufacturing an organic fertilizer is provided. A method of manufacturing an organic fertilizer comprises heating hot water, dissolving whey in the hot water to produce a whey mixture, filtering the whey mixture, combining the whey mixture with a fertilizer element selected from the group comprising CSL, oilseed extract, and mixtures thereof to produce a resultant mixture, and filtering the resultant mixture. Preferably, the hot water is heated to a temperature within the range of 135° F. to 175° F. More preferably, the hot water is heated to a temperature of 160° F. Preferably, a supplement selected from the group comprising natural glycerol, humate, fulvate, acetic acid, propionic acid, citric acid, lactic acid, and mixtures thereof with the resultant mixture prior to filtration. Preferably, the fertilizer element is filtered prior to combining with the whey mixture. Preferably, the fertilizer element is heated prior to combining with the whey mixture.

An alternative method for manufacturing an organic fertilizer is provided. A method of manufacturing an organic fertilizer comprises heating oilseed extract, dissolving whey in the hot oilseed extract, and filtering the resultant mixture.

Features and advantages disclosed herein will be further understood from the following detailed disclosure of certain embodiments.

DETAILED DESCRIPTION OF THE INVENTION

Organic fertilizer can be produced utilizing a variety of ingredients to obtain a variety of nitrogen-phosphorus-potassium (N-P-K) formulations. The desired N-P-K formulation can vary depending on the intended use of the fertilizer.

The present application is directed to a fertilizer that satisfies the organic standards for both the United States and the European Union. The organic fertilizer comprises oilseed extract and whey. Oilseed extract contains all of the soluble organic and organo-metallic compounds essential for plant growth, including the three primary plant nutrients: N, P and K; the three secondary plant nutrients: S, Ca and Mg; and many of the trace element micronutrients: Cu, Fe and Zn. Due to the amount of nutrients present in oilseed extract it acts as an effective fertilizer.

The oilseed extract may be combined with whey to form a fertilizer. Whey is a good supplement to oilseed extract because it is high in nitrogen, a primary plant nutrient, (oilseed extract is much lower in N) and high in calcium, a secondary plant nutrient. The nitrogen is provided in the form of amino acids and proteins, rather than in the form of nitrates.

Corn steep liquor (CSL) may also be used to supplement oilseed extract, or it may be used in combination with whey alone. CSL consists of the naturally occurring nutritive materials found in corn and contains the three primary plant nutrients: N, P and K; the three secondary plant nutrients: S, Ca and Mg; and many of the trace element micronutrients. Due to the nutrients present in the CSL, it is similar to oilseed extract in its effectiveness as a fertilizer.

An organic fertilizer is produced comprising oilseed extract and whey. The amount of oilseed extract in relation to the amount of whey can be varied considerably according to the final primary nutrient (N-P-K) concentration desired. Whey has a higher concentration of nitrogen and calcium than oilseed extract, so if more nitrogen is desired in a specific formulation, then additional whey may be added to the fertilizer mixture. A preferred organic fertilizer comprising oilseed extract and whey has an N-P-K formulation of 3-2-2. Another embodiment of the organic fertilizer comprising oilseed extract and whey has an N-P-K formulation of 2-0.5-2.5.

The organic fertilizer having oilseed extract and whey may further comprise CSL. Similar to oilseed extract, whey has a higher nitrogen and calcium concentration than CSL. If a higher nitrogen N-P-K formulation is desired, then an additional amount of whey may be added to the fertilizer. A preferred organic fertilizer comprising oilseed extract, CSL and whey has an N-P-K formulation of 3-2-2. Another embodiment of the organic fertilizer comprising oilseed extract, CSL and whey has an N-P-K formulation of 3-1-2.5. Additional formulations are possible depending on the primary nutrient concentration desired.

A different embodiment of an organic fertilizer comprises CSL and whey. CSL provides a strong N-P-K base formulation for the organic fertilizer, with whey supplementing the base formulation by providing additional nitrogen, as well as providing calcium and carbohydrates. A preferred organic fertilizer comprising CSL and whey has an N-P-K formulation of 3-2-2. The amount of CSL and whey may vary considerably depending on the desired N-P-K formulation.

An organic fertilizer comprising oilseed extract and/or CSL in combination with whey may comprise additional supplements. Such additional supplements may be selected from one of the following: glycerol; humates (humic acid); fulvates (fulvic acid); acetic acid; propionic acid; citric acid; lactic acid; or combinations thereof Additional nitrogen sources that may be utilized to supplement the organic fertilizer include health food protein supplements such as hemp protein powder, soy protein powder, etc. The protein supplements may additionally be utilized in combination with CSL and/or oilseed extract, in place of whey.

A method for manufacturing an organic fertilizer comprising oilseed extract and/or CSL in combination with whey and/or protein supplements comprises first dissolving the whey and/or protein supplements in hot water. Preferably, the temperature of the water for dissolving the whey and/or protein supplements will be approximately 135° to 175° F. More preferably, the temperature of the water for dissolving the whey and/or protein supplements will be approximately 160°

F. The water may additionally be supplemented with naturally produced glycerol. If the whey and/or protein supplements are not dissolved in hot water it may clump, may not dissolve completely, or may take an inordinately long time to dissolve. Additionally, the whey and/or protein supplements are extremely viscous so the dilution aids in producing a solution that is more efficient to work with.

After the dissolution of the whey and/or protein supplements small clumps may still be present. The small clumps may be removed by filtration, centrifugation, or other means prior to adding the dissolved whey and/or protein supplements to the CSL and/or oilseed extract.

Upon completion of filtering the whey and/or protein supplements solution, the solution is combined with the oilseed extract and/or CSL. To further facilitate the mixing of the solution with the oilseed extract and/or CSL, the oilseed extract and/or CSL can be heated prior to mixing. Preferably, the temperature of the oilseed extract and/or CSL will be approximately 135° F. to 175° F. More preferably, the temperature of the oilseed extract and/or CSL will be approximately 160° F. Alternatively, the oilseed extract and/or CSL can be filtered prior to mixing with the solution. Once the solution has been combined with the oilseed extract and/or CSL the resulting mixture must be stirred to intimately blend the ingredients into a uniform mixture with no nutrient concentration in stratified layers.

Prior to filtering the resultant mixture, an additional supplement may be added. The supplement may be selected from the group comprising glycerol, humate (humic acid), fulvate (fulvic acid), acetic acid, propionic acid, citric acid, lactic acid, and mixtures thereof.

The resultant mixture of dissolved whey and/or protein supplements in combination with oilseed extract and/or CSL must be filtered to remove particulate matter that is present in both oilseed extract and CSL. Several filtrations using successively smaller pores may be necessary depending upon the diameter of the irrigation delivery system to be utilized. If an agricultural fertigation mechanism is to be utilized, the amount and size of any particulate matter can be relatively large, as the spray nozzles are relatively large, and further filtration is not necessary. In a different aspect, if the plant food is to be utilized in a greenhouse that uses either narrow diameter tubing or an overhead sprayer/mister to fertilize the plants, the resultant mixture must be finely filtered to remove the majority of the particulate matter to prevent clogging of the delivery system. Preferably, the resultant mixture is filtered at 10 microns or less. The final mixture may be diluted with water to vary the desired nutrient analysis in the final formulation of the organic plant food.

In another embodiment, a method for manufacturing an organic fertilizer comprising oilseed extract and whey and/or protein supplements comprises heating the oilseed extract prior to mixing with the whey and/or protein supplements. Preferably, the temperature of the oilseed extract will be approximately 135° F. to 175° F. More preferably, the temperature of the oilseed extract will be approximately 160° F. The whey and/or protein supplements can be dissolved in the heated oilseed extract without the addition of water. The oilseed extract is very fluid and does not require dilution with water prior to mixing with the whey and/or protein supplements, unlike CSL which is very viscous.

Prior to filtering the resultant mixture, an additional supplement may be added. The supplement may be selected from the group comprising glycerol, humate (humic acid), fulvate (fulvic acid), acetic acid, propionic acid, citric acid, lactic acid, and mixtures thereof.

The mixture must be filtered to remove particulate matter that is present in the oilseed extract. Several filtrations using successively smaller pores may be necessary depending upon the diameter of the irrigation delivery system to be utilized. Water may be added to assist the filtration if necessary. If an agricultural fertigation mechanism is to be utilized, the amount and size of any particulate matter can be relatively large, as the spray nozzles are relatively large, and further filtration is not necessary. In a different aspect, if the plant food is to be utilized in a greenhouse that uses either narrow diameter tubing or an overhead sprayer/mister to fertilize the plants, the resultant mixture must be finely filtered to remove the majority of the particulate matter to prevent clogging of the delivery system. Preferably, the resultant mixture is filtered at 10 microns or less. The final mixture may be diluted with water to vary the desired nutrient analysis in the final formulation of the organic plant food. The water may additionally be supplemented with naturally produced glycerol.

EXAMPLES

TABLE 1

Percent (%) by weight of N, P, and K in cheese whey, CSL, and oilseed extract

|  | % N | % P | % K |
|---|---|---|---|
| Cheese Whey | 13 | 0 | 0 |
| CSL | 3 | 4 | 3 |
| Oilseed Extract | 1 | 1 | 5 |

Example 1

Using the nutrient concentrations of Table 1 to produce a desired commercial formulation, the following procedure is offered:

1. To make 1,000 lbs of 3.1 N, 2.4 P, 2.4 K (where P is not expressed as $P_2O_5$ and K is not expressed as $K_2O$):
   a.) add 600 lbs CSL to mixing tank;
   b.) separately, add 300 lbs water to another mixing tank and heat to approximately 160° F.;
   c.) add 100 lbs cheese whey to hot water and mix thoroughly;
   d.) filter cheese whey/water mixture and add to CSL while stirring/mixing thoroughly; and
   e.) filter resultant mixture.

Example 2

Using the nutrient concentrations of Table 1 to produce a desired commercial formulation, the following procedure is offered:

1. To make 1,000 lbs of: 1.9% N, 0.6% P, 2.5% K (where P is not expressed as $P_2O_5$ and K is not expressed as $K_2O$):
   a.) add 600 lbs oilseed extract to a mixing tank;
   b.) to a separate mixing tank add 300 lbs water and heat to approximately 165° F.;
   c.) add 100 lbs cheese whey to hot water and mix thoroughly;
   d.) filter the cheese whey in water mixture and add to the oilseed-extract, mix thoroughly; and
   e.) filter.

Example 3

Using the nutrient concentrations of Table 1 to produce a desired commercial formulation, the following procedure is offered:

1. To make a 1,000 lb batch of 2.8% N, 1.0% P, 2.4% K (where P is not expressed as $P_2O_5$ and K is not expressed as $K_2O$):
   a.) add 300 lbs oilseed-extract and 300 lbs CSL to a mixing tank. Stir/mix well;
   b.) to a separate tank add 300 lbs water and heat to approximately 165° F.;
   c.) add 100 lbs cheese whey to the hot water and stir/mix thoroughly;
   d.) filter the cheese whey-water mixture;
   e.) add the cheese whey-water mixture to the 1st tank containing oilseed-extract and CSL; and
   f.) filter.

In light of the foregoing disclosure and description of various embodiments, those skilled in the area of this technology will readily understand that various modifications and adaptations can be made without departing from the scope and spirit of the invention.

What is claimed is:

1. An organic fertilizer consisting essentially of corn steep liquor, oilseed extract and whey.

2. The organic fertilizer of claim 1 further including a supplement selected from the group consisting of natural glycerol, humate, fulvate, acetic acid, propionic acid, citric acid, lactic acid, and mixtures thereof.

3. The organic fertilizer of claim 1 wherein the N-P-K formulation is 3-2-2.

4. The organic fertilizer of claim 1 wherein the N-P-K formulation is 2-0.5-2.5.

5. The organic fertilizer of claim 1 further comprising a protein supplement.

6. The organic fertilizer of claim 5 wherein the protein supplement is selected from the group consisting of hemp protein powder, soy protein powder and mixtures thereof.

7. The organic fertilizer of claim 6 wherein the N-P-K formulation is 3-2-2.

8. The organic fertilizer of claim 1 wherein the N-P-K formulation is 3-1-2.5.

9. An organic fertilizer consisting essentially of corn steep liquor and whey.

10. The organic fertilizer of claim 9 further including a supplement selected from the group consisting of natural glycerol, humate, fulvate, acetic acid, propionic acid, citric acid, lactic acid and mixtures thereof.

11. The organic fertilizer of claim 9 further including a protein supplement.

12. The organic fertilizer of claim 11 wherein the protein supplement is selected from the group consisting of hemp protein powder, soy protein powder and mixtures thereof.

13. The organic fertilizer of claim 9 wherein the N-P-K formulation is 3-2-2.

14. A method for manufacturing an organic fertilizer comprising:
   heating water;
   dissolving whey in the hot water to produce a whey mixture;
   filtering the whey mixture;
   combining the whey mixture with a fertilizer element selected from the group consisting of corn steep liquor, oilseed extract, and mixtures thereof to produce a resultant mixture; and
   filtering the resultant mixture.

15. The method for manufacturing an organic fertilizer of claim 14 wherein the water is heated to a temperature within the range of 135° F. to 175° F.

16. The method for manufacturing an organic fertilizer of claim 14 wherein the water is heated to a temperature of 160° F.

17. The method for manufacturing an organic fertilizer of claim 14 further comprising mixing a supplement selected from the group consisting of natural glycerol, humate, fulvate, acetic acid, propionic acid, citric acid, lactic acid, and mixtures thereof with the resultant mixture prior to filtration.

18. The method for manufacturing an organic fertilizer of claim 14 wherein the fertilizer element is filtered prior to combining with the whey mixture.

19. The method for manufacturing an organic fertilizer of claim 14 wherein the fertilizer element is heated prior to combining with the whey mixture.

20. A method for manufacturing an organic fertilizer comprising:
   heating an oilseed extract;
   dissolving a whey in the heated oilseed extract to produce a resultant mixture; and
   filtering the resultant mixture.

* * * * *